(12) United States Patent
Morita et al.

(10) Patent No.: US 11,554,319 B2
(45) Date of Patent: Jan. 17, 2023

(54) INPUT DEVICE

(71) Applicant: Sony Interactive Entertainment Inc., Tokyo (JP)

(72) Inventors: Masaho Morita, Tokyo (JP); Kazuyuki Suzuki, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/297,720

(22) PCT Filed: Nov. 29, 2019

(86) PCT No.: PCT/JP2019/046912
§ 371 (c)(1),
(2) Date: May 27, 2021

(87) PCT Pub. No.: WO2020/116357
PCT Pub. Date: Jun. 11, 2020

(65) Prior Publication Data
US 2022/0040567 A1    Feb. 10, 2022

(30) Foreign Application Priority Data
Dec. 7, 2018    (JP) .............................. JP2018-230242

(51) Int. Cl.
*G06F 3/041*    (2006.01)
*A63F 13/24*    (2014.01)
(Continued)

(52) U.S. Cl.
CPC ................ *A63F 13/24* (2014.09); *G06F 3/02* (2013.01); *G06F 3/03547* (2013.01)

(58) Field of Classification Search
CPC ........ G06F 3/02; G06F 3/03547; A63F 13/24; A63F 13/28; A63F 13/214
See application file for complete search history.

(56) References Cited

U.S. PATENT DOCUMENTS 7,347,780 B1 *    3/2008    Best ........................ A63F 13/52
                                                        463/31
8,773,383 B2    7/2014    Yamamoto
(Continued)

FOREIGN PATENT DOCUMENTS

JP    2012507079 A    3/2012
JP    2013020604 A    1/2013
(Continued)

OTHER PUBLICATIONS

International Search Report for corresponding PCT Application No. PCT/JP2019/046912, 4 pages, dated Feb. 18, 2020.
(Continued)

*Primary Examiner* — Joe H Cheng
(74) *Attorney, Agent, or Firm* — Matthew B. Dernier, Esq.

(57) ABSTRACT

An operation pad (20) has an exterior plate (21) having a light-emitting unit (E1) and a touch sensor substrate (22) attached to the rear surface of the exterior plate (21). In addition, the operation pad (20) has a light source (S1) attached to the rear surface thereof and a light diffusion member (H1) that is an optical path through which light of the light source (S1) passes toward the light-emitting unit (E1). According to the structure, the structure for allowing the light-emitting unit provided on the operation pad to shine can be downsized.

13 Claims, 8 Drawing Sheets

(51) Int. Cl.
*G06F 3/02* (2006.01)
*G06F 3/0354* (2013.01)

(56) References Cited

U.S. PATENT DOCUMENTS

| | | | |
|---|---|---|---|
| 9,726,366 B2 | 8/2017 | Nakazawa | |
| 9,911,552 B2* | 3/2018 | Morita | G06F 3/0338 |
| 2011/0157097 A1* | 6/2011 | Hamada | G06F 3/0421 |
| | | | 345/175 |
| 2012/0319968 A1 | 12/2012 | Sakayori | |
| 2014/0018173 A1* | 1/2014 | Urhman | A63F 13/24 |
| | | | 463/37 |
| 2015/0193017 A1* | 7/2015 | Igarashi | G06F 3/03547 |
| | | | 345/161 |
| 2015/0290534 A1 | 10/2015 | Iharashi | |
| 2016/0147345 A1* | 5/2016 | Lee | G06F 1/1637 |
| | | | 345/173 |
| 2016/0147361 A1* | 5/2016 | Ahn | G06F 3/041 |
| | | | 345/173 |
| 2016/0224173 A1 | 8/2016 | Nakazawa | |
| 2017/0348596 A1* | 12/2017 | Igarashi | A63F 13/23 |
| 2018/0011242 A1* | 1/2018 | Morita | G02B 6/0088 |
| 2018/0314406 A1 | 11/2018 | Powderly | |
| 2019/0388779 A1* | 12/2019 | Morita | A63F 13/214 |
| 2021/0197081 A1* | 7/2021 | Morita | A63F 13/218 |

FOREIGN PATENT DOCUMENTS

| | | |
|---|---|---|
| JP | 2014142777 A | 8/2014 |
| JP | 2015072540 A | 4/2015 |
| JP | 2016110775 A | 6/2016 |
| JP | 2016143252 A | 8/2016 |
| WO | 2010048373 A2 | 4/2010 |

OTHER PUBLICATIONS

International Preliminary Report on Patentability and Written Opinion for corresponding PCT Application No. PCT/JP2019/046912, 11 pages, dated Jun. 17, 2021.
Notice of Reasons for Refusal for corresponding JP Application No. 2020-559154, 7 pages, dated Aug. 25, 2022.
Extended Eurpoean Search Report for corresponding EP Application No. 19892364.1, 6 pages, dated Jul. 21, 2022.

* cited by examiner

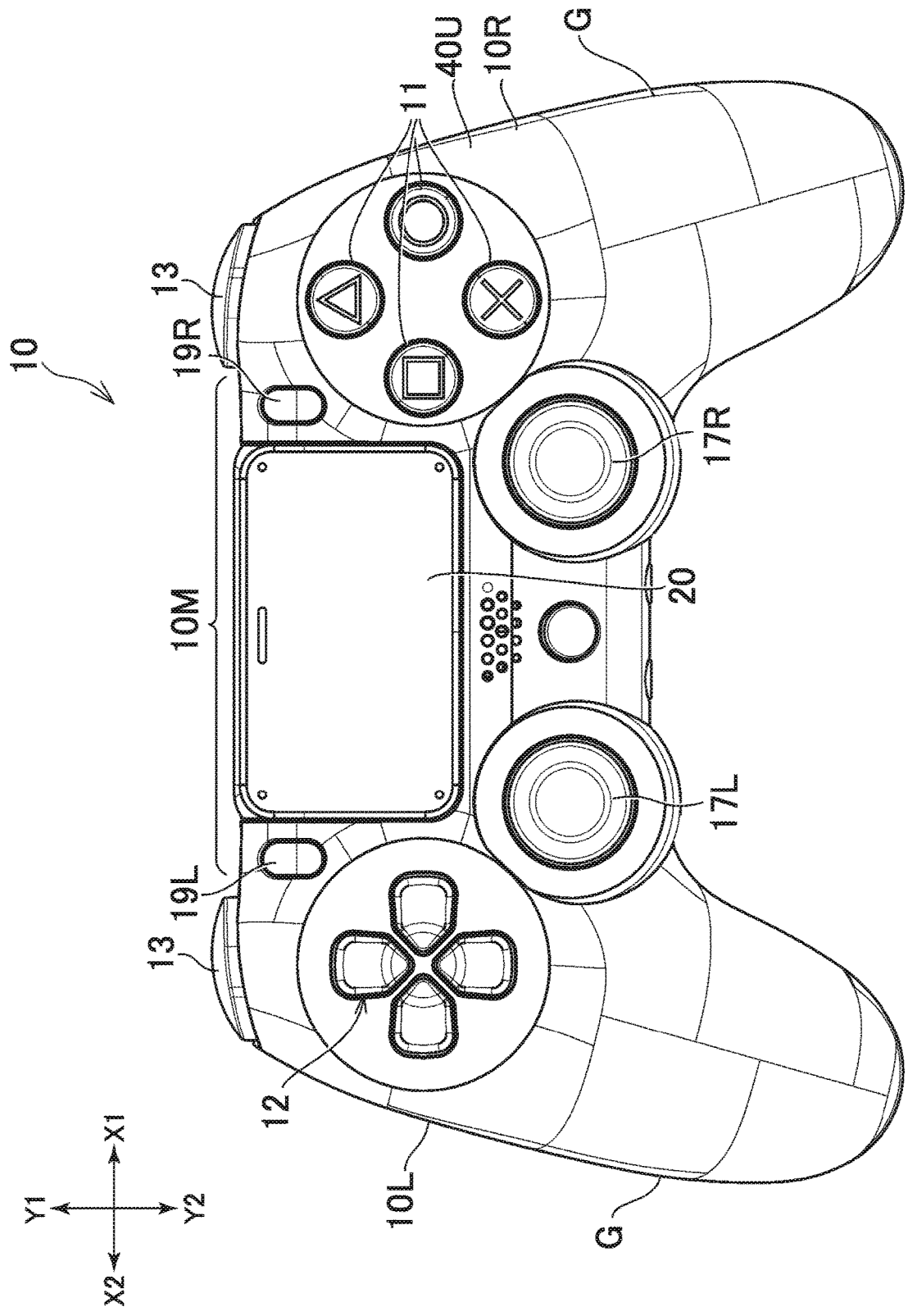

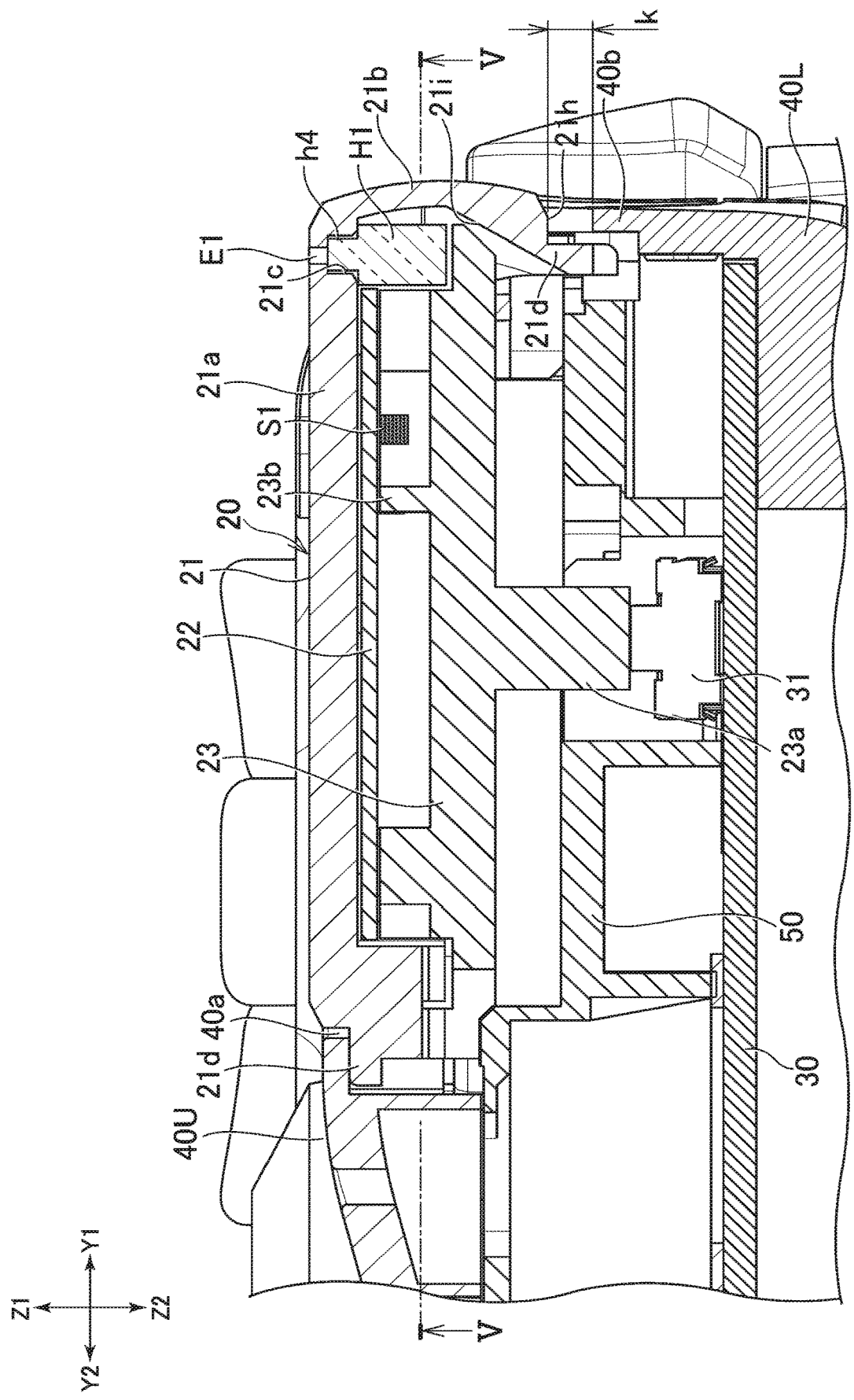

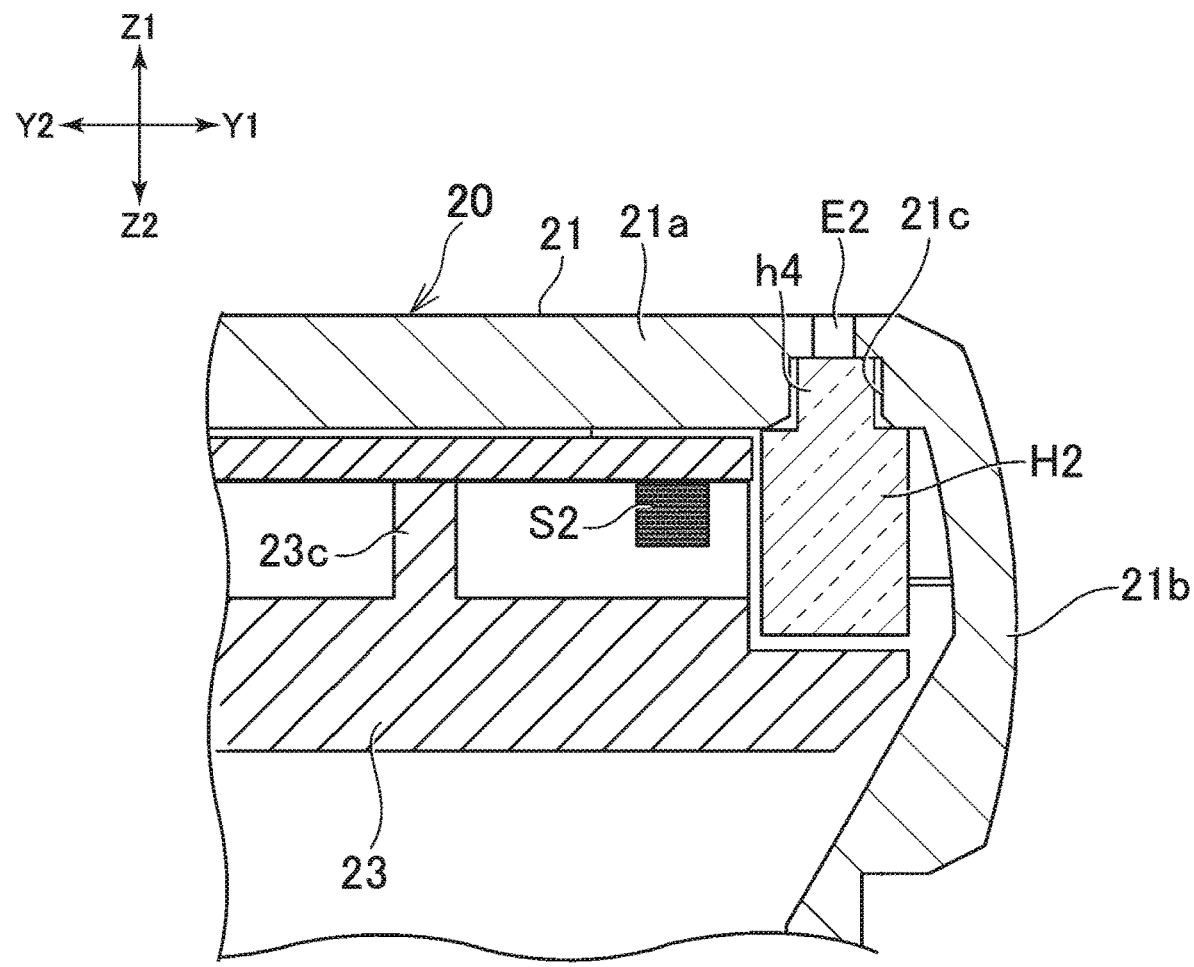

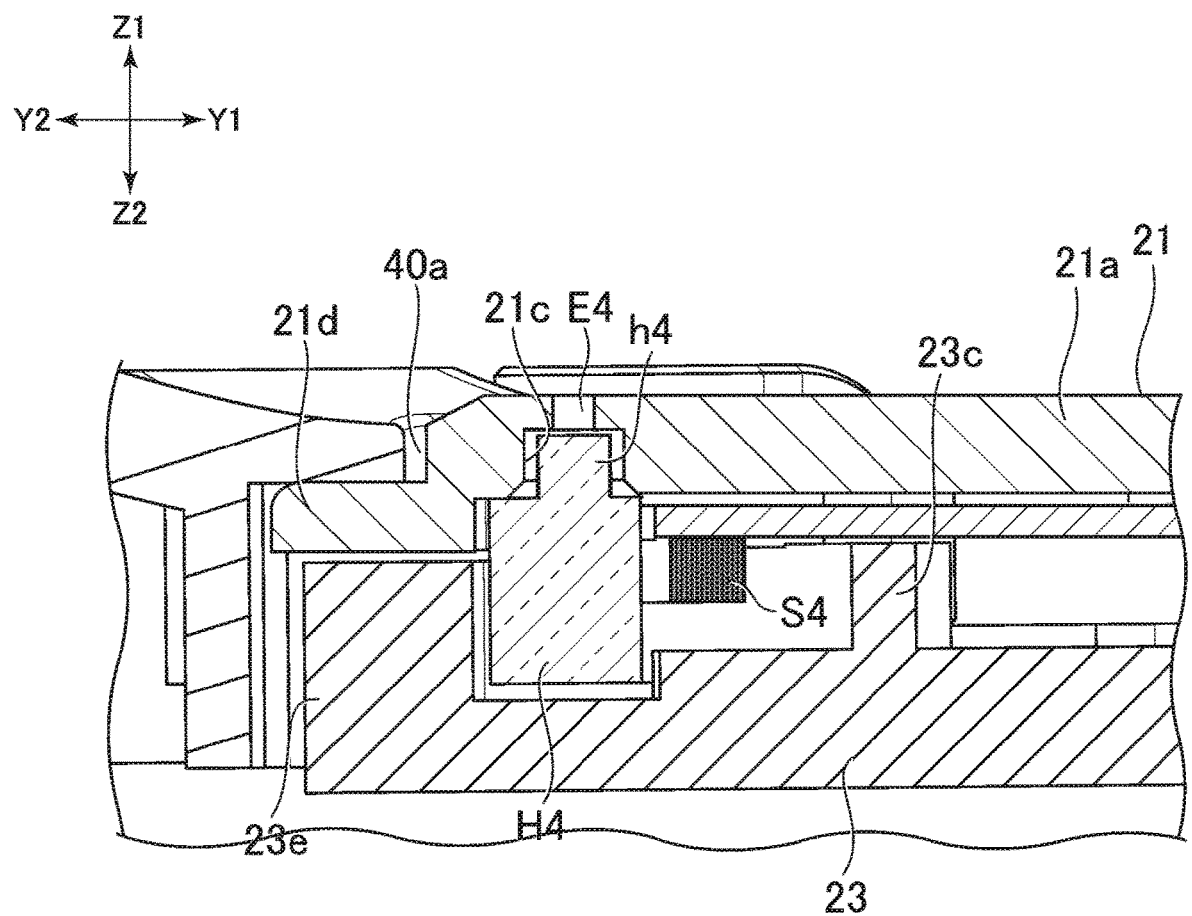

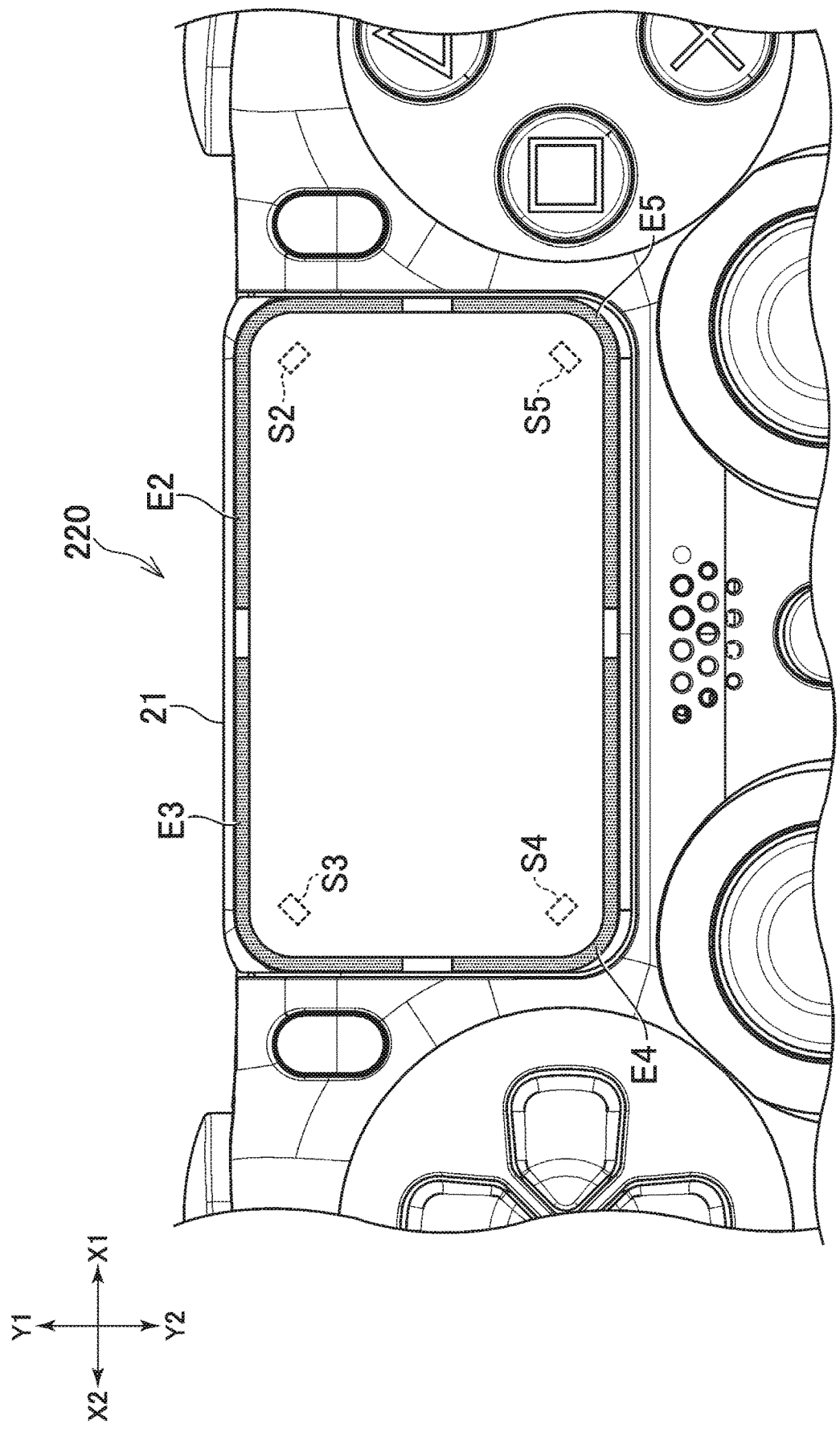

INPUT DEVICE

CROSS REFERENCE TO RELATED APPLICATIONS

This is a national stage application of International Application No. PCT/JP2019/046912, filed Nov. 29, 2019; and which claims priority to JP Application No. 2018-230242, filed Dec. 7, 2018, the entire disclosures of which are hereby incorporated by reference.

TECHNICAL FIELD

The present disclosure relates to an input device having a touch sensor.

BACKGROUND ART

Among input devices used for game operations, there is one that has an operation pad having a touch sensor on an upper surface of the input device. In FIG. 24 of the specification of U.S. Patent Application Publication No. 2015/0290534, an input device in which a light emitting region is defined on a surface of an operation pad is disclosed. For example, when plural users play a game at the same time, the light emitting region of the operation pad emits light of a color assigned to each user.

SUMMARY OF INVENTION

Technical Problem

However, since a light source (specifically, a light emitting diode) for allowing a light emitting region to emit light is attached to a position apart downward from an operation pad in an input device of the specification of U.S. Patent Application Publication No. 2015/0290534, a structure (for example, a light guide member) for guiding light of the light source to the light emitting region becomes large. Therefore, for example, it is difficult to provide plural light emitting regions on the operation pad, and the position selection of the light emitting regions is also largely restricted.

Solution to Problem

An input device proposed in the present disclosure has an operation pad having an exterior plate having at least one light-emitting unit and a touch sensor substrate attached to a rear surface of the exterior plate. In addition, the input device has at least one light source attached to a rear surface of the operation pad and an optical path through which light of the at least one light source passes toward the at least one light-emitting unit. According to the input device, the optical path from the light source to the light-emitting unit can be shortened, and the structure for allowing the light-emitting unit to shine can be downsized.

BRIEF DESCRIPTION OF DRAWINGS

FIG. 1A is a plan view for depicting an example of an input device proposed in the present disclosure.
FIG. 2 is a cross-sectional view taken along the line II-II depicted in FIG. 1B.
FIG. 3 is a cross-sectional view taken along the line III-III depicted in FIG. 1B.
FIG. 4 is a cross-sectional view taken along the line IV-IV depicted in FIG. 1B.
FIG. 7 is a plan view for depicting still another example of the input device proposed in the present disclosure.

DESCRIPTION OF EMBODIMENT

Figure 1B:
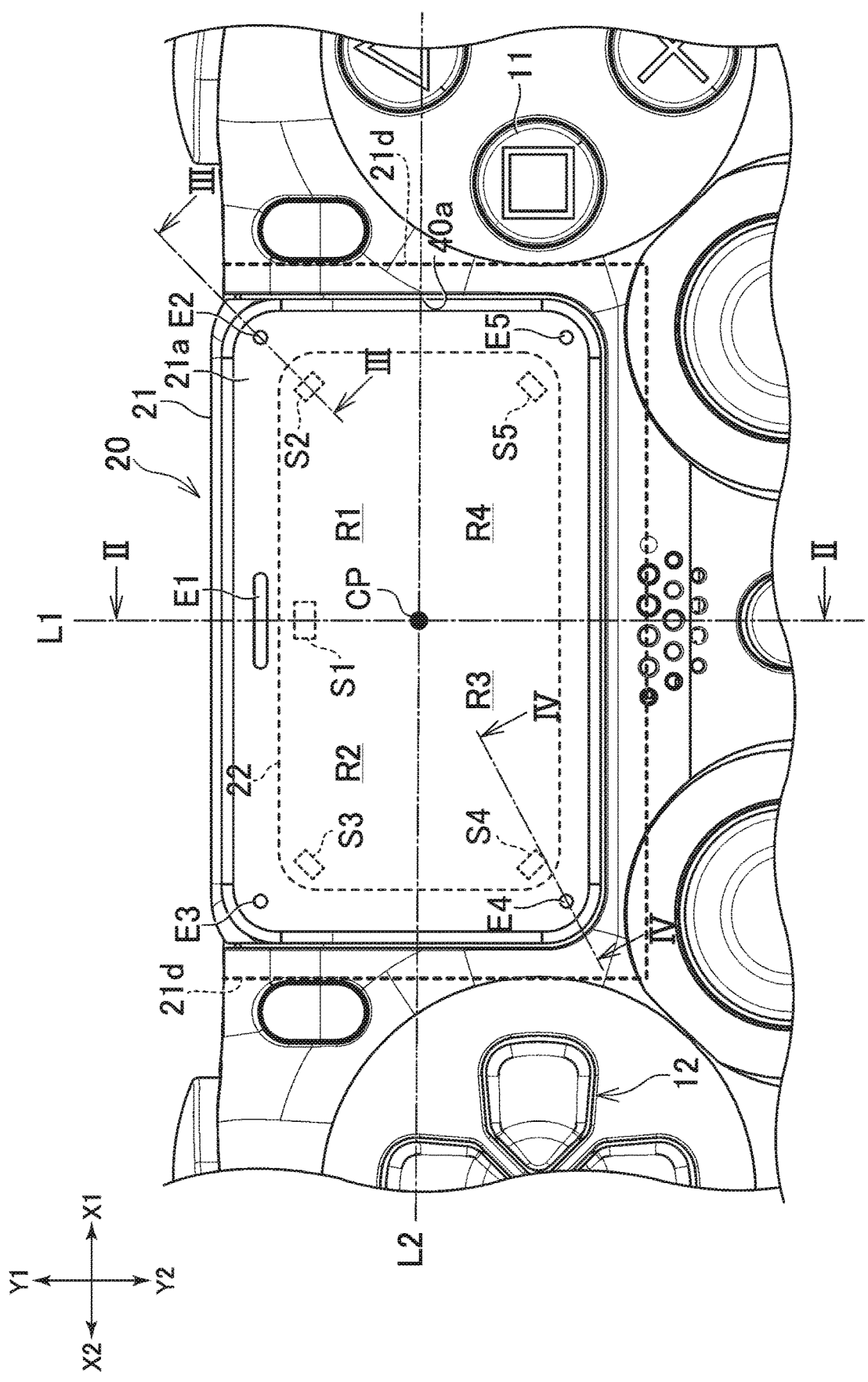
FIG. 1B is an enlarged view of FIG. 1A.

Hereinafter, an input device proposed in the present disclosure will be described. As an example of the input device proposed in the present disclosure, an input device 10 depicted in FIG. 1A and the like will be described in the specification.

In the following description, directions indicated by X1 and X2 in FIG. 1A are referred to as right and left, respectively, and directions indicated by Y1 and Y2 are referred to as front and rear, respectively. In addition, directions indicated by Z1 and Z2 in FIG. 2 are referred to as upper and lower, respectively.

The input device 10 is used as an input device for an information processing device having a function of executing a game program, a function of reproducing a moving image, a function of communicating through the Internet, and the like. The input device 10 can perform wired or wireless communications with the information processing device, and transmits to the information processing device a signal according to an operation performed for the input device 10 by a user. The input device 10 incorporates various sensors (an acceleration sensor, a gyro sensor, and the like) used to detect an attitude and movement of the input device 10, a battery, and the like.

[Operation Member]

As depicted in FIG. 1A, the input device 10 is a device that is held and operated with both hands, and has a right held portion 10R held with the right hand and a left held portion 10L held with the left hand. Operation members are arranged on an upper surface of the right held portion 10R and an upper surface of the left held portion 10L. For example, four operation buttons 11 positioned at apexes of a rhombus are arranged on the upper surface of the right held portion 10R. A cross-shaped direction key 12 is arranged on the upper surface of the left held portion 10L. Operation buttons 13 are arranged on a front surface of the right held portion 10R and a front surface of the left held portion 10L. Each of the right held portion 10R and the left held portion 10L has a swelling portion G extending rearward from regions where the operation members (the direction key 12 and the four operation buttons 11 in the example of the input device 10) on the upper surface are arranged.

As depicted in FIG. 1A, the input device 10 has a central portion 10M positioned between the right held portion 10R and the left held portion 10L. The swelling portions G of the held portions 10R and 10L extend further rearward relative to a rear end of the central portion 10M.

The input device 10 has an operation pad 20 that is a plate-like operation member. In the example of the input device 10, the operation pad 20 is arranged on the upper surface of the central portion 10M as depicted in FIG. 1A. The operation pad 20 is positioned between the operation members (specifically, the four operation buttons 11) arranged on the upper surface of the right held portion 10R and the operation member (specifically, the direction key 12) arranged on the upper surface of the left held portion 10L.

The structure of the operation pad 20 will be described in detail later. The input device 10 further has operation buttons 19R and 19L arranged on the right side and left side of the operation pad 20, respectively, and operation sticks 17R and 17L positioned behind the operation pad 20.

The shape of the input device proposed in the present disclosure is not limited to the example of the input device 10 depicted in FIG. 1A and the like. For example, the rear end of the central portion 10M may reach the rear ends of the held portions 10R and 10L. That is, the held portions 10R and 10L do not need to have the swelling portions G extending rearward. As still another example, the input device may be operated with one hand. For example, the input device may be in a rod shape. In this case, the operation pad 20 may be arranged at a position that can be operated with the thumb.

In addition, the types and arrangement of the operation members are not limited to the example of the input device 10. For example, the positions of the four operation buttons 11 and the positions of the direction key 12 and the operation sticks 17R and 17L may be appropriately changed. For example, the direction key 12 may be arranged on the right held portion 10R and the operation buttons 11 may be arranged on the left held portion 10L. In addition, the input device 10 does not need to have both or either of the two operation sticks 17R and 17L.

[Operation Pad]

Figure 5:
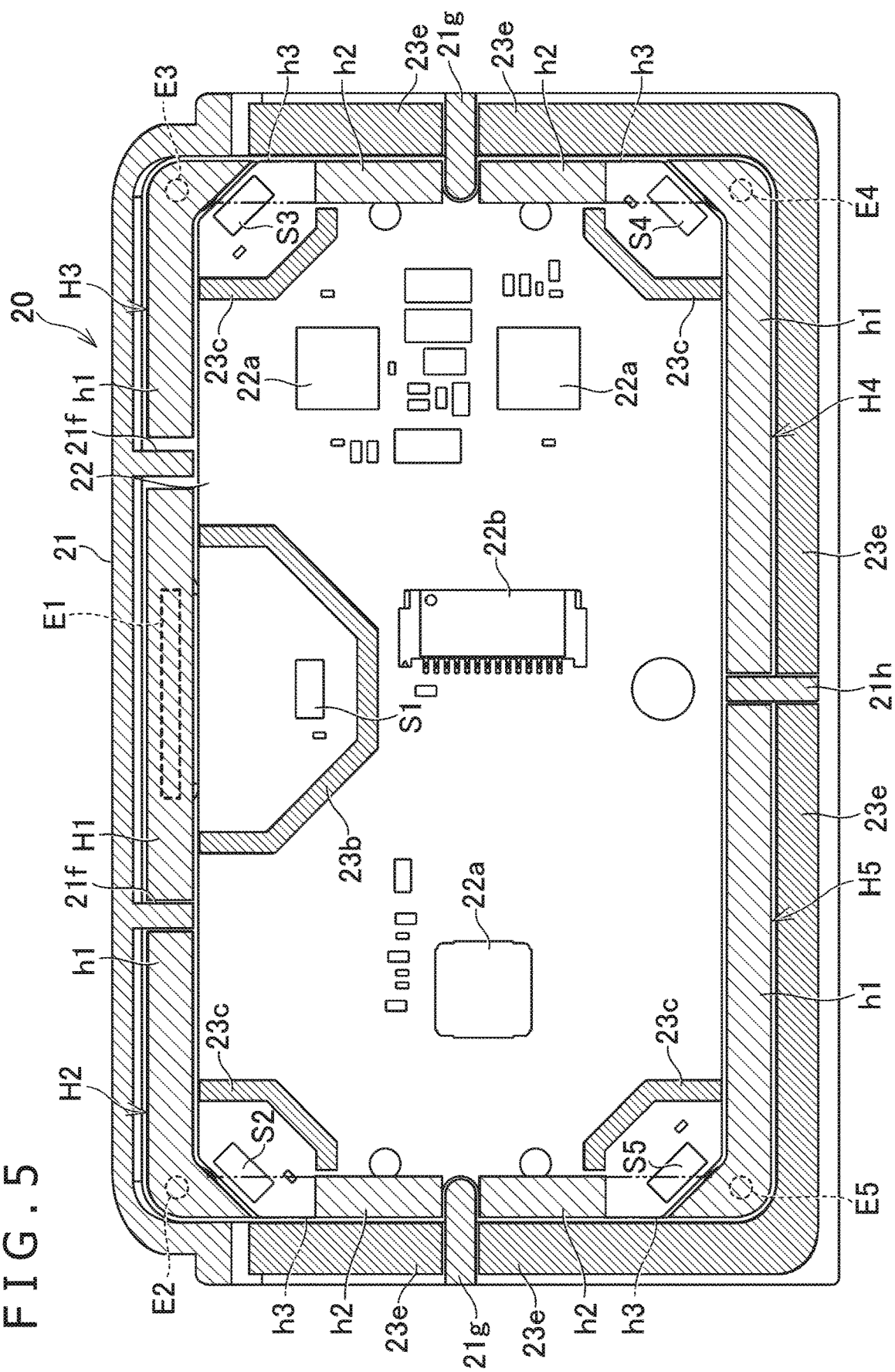
FIG. 5 is a cross-sectional view of an operation pad when viewed on the line V-V depicted in FIG. 2.

The operation pad 20 is arranged at a front portion of the upper surface of the central portion 10M. As depicted in FIG. 2, the operation pad 20 has an exterior plate 21 and a touch sensor substrate 22. The exterior plate 21 is positioned at the uppermost part of the operation pad 20 and configures a part of the upper surface of the central portion 10M. The touch sensor substrate 22 is attached to the rear surface (lower surface) of the exterior plate 21. The touch sensor substrate 22 is bonded to, for example, the exterior plate 21. Plural detection electrodes arranged in the front-rear direction and the left-right direction are formed on the upper surface (the surface in contact with the exterior plate 21) of the touch sensor substrate 22, and the touch sensor substrate 22 functions as a touch sensor for detecting the position touched with a finger when the user touched the exterior plate 21 with the finger. The touch sensor substrate 22 is, for example, an electrostatic capacitive touch sensor, but the type thereof is not limited to this. As depicted in FIG. 5, plural IC (Integrated Circuit) chips 22a functioning as a driving circuit of the touch sensor, a driving circuit of light sources S1 to S2 to be described later, and the like are mounted on the rear surface of the touch sensor substrate 22. These driving circuits may be mounted on a main substrate 30 (see FIG. 2).

The input device 10 has an exterior member configuring the exterior thereof. The exterior member has an upper case 40U (see FIG. 1A) and a lower case 40L (see FIG. 2) combined with the upper case 40U in the up-down direction. A rectangular opening 40a (see FIG. 1B) is formed in the upper case 40U. The operation pad 20 is fitted inside the opening 40a.

[Movement of Operation Pad]

The operation pad 20 can be moved up and down, and functions as a push button. As depicted in FIG. 2, the operation pad 20 has a back frame 23 attached to the rear surface side (lower side) of the exterior plate 21. The back frame 23 covers the lower surface of the touch sensor substrate 22 and is attached to the exterior plate 21. The back frame 23 has a push portion 23a positioned substantially at the center of the operation pad 20. The push portion 23a has, for example, a columnar shape protruding downward. The main substrate 30 is arranged below the back frame 23. The main substrate 30 is a circuit substrate on which a communication circuit for transmitting a signal indicating an operation of the operation members to an information processing device such as a game device and a control circuit for controlling charging/discharging of a battery are mounted. The main substrate 30 has, at the position corresponding to the push portion 23a, a sensor for detecting depression of the operation pad 20, that is, a change in the position of the operation pad 20 in the up-down direction. In the example of the input device 10, a switch 31 is used as the sensor. The switch 31 is, for example, an on/off switch. When the operation pad 20 is pushed by the user, the push portion 23a pushes the switch 31. Thus, the position pushed by the user can be detected based on an output signal of the touch sensor substrate 22 and an output signal of the switch 31. The output signal of the touch sensor substrate 22 and the output signal of the switch 31 are input to, for example, a microprocessor mounted on the main substrate 30 and transmitted to the information processing device (game device). Note that the type of the sensor is not limited to the switch 31. Instead of the switch 31, a sensor that can detect the pressing amount of the operation pad 20 may be used.

The input device 10 has an elastic member (not depicted in the drawing) for pushing the operation pad 20 upward. The operation pad 20 is pushed down by the user and then returned to the initial position by the force of the elastic member. As depicted in FIG. 2, the input device 10 has a frame 50 between the main substrate 30 and the operation pad 20. The elastic member is arranged, for example, on the upper side of the frame 50 to push the back frame 23 upward. The support structure of the operation pad 20 is not limited to the example of the input device 10. For example, the elastic member may be arranged on the main substrate 30.

[Position of Operation Pad]

In the example of the input device 10, the operation pad 20 is positioned foremost on the upper surface of the central portion 10M. In addition, the operation pad 20 configures a front edge of the central portion 10M. As depicted in FIG. 2, the exterior plate 21 has a portion 21a (hereinafter, referred to as an upper plate portion) configuring the upper surface of the central portion 10M and a portion 21b (front plate portion) configuring the front surface of the central portion 10M. The upper plate portion 21a has a quadrangular shape in plan view. The front plate portion 21b extends downward from a front portion of the upper plate portion 21a to configure the front surface of the input device 10. The opening 40a of the upper case 40U in which the operation pad 20 is arranged opens not only upward but also forward.

The arrangement and shape of the operation pad 20 are not limited to the example of the input device 10. For example, the operation pad 20 may be positioned apart rearward from the front edge of the central portion 10M. In this case, the exterior plate 21 does not need to have the front plate portion 21b.

[Light Emission and Light Source]

As depicted in FIG. 1B, the exterior plate 21 has plural light-emitting units E1 to E5. The light-emitting units E1 to E5 are regions which are defined on the surface (upper surface) of the exterior plate 21 and from which light visually confirmed by the user exits. In the example of the input device 10, the exterior plate 21 is formed of an opaque material, and the light-emitting units E1 to E5 are holes formed in the exterior plate 21. As will be described later, the exterior plate 21 may be formed of a material through which light passes. In this case, the light-emitting units E1 to E5 may be regions that are defined by light shielding portions and through which light passes.

The light-emitting unit E1 is positioned, for example, at the center of the front edge of the upper plate portion 21a in the left-right direction. The light-emitting units E2 to E5 are positioned, for example, at four corners of the upper plate portion 21a. Plural light sources S1 to S5 are attached to the rear surface of the operation pad 20. As the light sources S1 to S5, light emitting diodes (LEDs) can be used. The light sources S1 to S5 are attached to the operation pad 20, and thus moved up and down together with the operation pad 20 when the operation pad 20 receives a depression operation. The light sources S1 to S5 are provided to the plural light-emitting units E1 to E5, respectively. The operation pad 20 has optical paths, on the rear surface thereof, configured using light diffusion members H1 to H5. The light of the light sources S1 to S5 passes through the optical paths toward the light-emitting units E1 to E5, and allows the light-emitting units E1 to E5 to shine.

As described above, since the light sources S1 to S5 are attached to the rear surface of the operation pad 20, the optical paths from the light sources S1 to S5 to the light-emitting units E1 to E5 can be shortened, the structure for allowing the light-emitting units E1 to E5 to shine can be downsized, and the degree of freedom for the position selection of the light-emitting units E1 to E5 can be increased. In addition, the light sources S1 to S5, the optical paths that are the light diffusion members H1 to H5, and the light-emitting units E1 to E5 are provided in the operation pad 20 itself. Therefore, when the operation pad 20 is pushed down, the light sources S1 to S5, the optical paths, and the light-emitting units E1 to E5 are integrally moved. That is, even when the operation pad 20 is moved up and down, the positional relation among the light sources S1 to S5, the optical paths, and the light-emitting units E1 to E5 is kept. As a result, the brightness and colors of the light-emitting units E1 to E5 can be appropriately maintained.

A microprocessor mounted on the main substrate 30 or the touch sensor substrate 22 separately controls lighting of the light sources S1 to S5. In addition, the light sources S1 to S5 are provided to the plural light-emitting units E1 to E5, respectively. Accordingly, the light-emitting units E1 to E5 can separately shine. For example, only one of the light-emitting units E2 to E5 arranged at the four corners can shine, or only the light-emitting unit E1 arranged on the front side can shine. When the light-emitting units E1 to E5 shine, the user can be guided to, for example, a position to be touched with a finger. For example, when the light-emitting unit E1 blinks, the user can recognize the light-emitting unit E1 as a position to be touched with a finger.

The IC chips 22a functioning as a driving circuit of the touch sensor are mounted on the rear surface of the touch sensor substrate 22 (see FIG. 5). The touch sensor substrate 22 is electrically connected to the main substrate 30, and a signal obtained by the touch sensor substrate 22 is input to the microprocessor mounted on the main substrate 30. The touch sensor substrate 22 and the main substrate 30 are connected to each other through, for example, a flexible printed circuit (FPC). The above-described light sources S1 to S5 are attached to the touch sensor substrate 22. In more detail, the light sources S1 to S5 are attached to the rear surface (lower surface) of the touch sensor substrate 22. In the example of the input device 10, the light source S1 is positioned at the center of the touch sensor substrate 22 in the left-right direction. As will be described in detail later, the light sources S2 to S5 are arranged while being associated with the four corners of the touch sensor substrate 22.

According to the structure of the input device 10 in which the light sources S1 to S5 are mounted on the touch sensor substrate 22, the number of parts of the operation pad 20 can be reduced. For example, an electric wire for supplying electric power to the light sources S1 to S5 and an electric wire for transmitting a signal of the touch sensor substrate 22 can be commonalized. That is, electric power can be supplied to the light sources S1 to S5 by using an FPC for transmitting the signal of the touch sensor substrate 22. As depicted in FIG. 5, a connector 22b for connecting the FPC is mounted on the touch sensor substrate 22. A circuit pattern for electrically connecting the terminals of the connector 22b to the plural light sources S1 to S5 is formed on the touch sensor substrate 22.

In addition, since the light sources S1 to S5 are attached to the rear surface of the touch sensor substrate 22, a ratio of a contact detectable region of the touch sensor substrate 22 to the upper plate portion 21a can be increased. That is, for example, when the light sources S1 to S5 are arranged next to the touch sensor substrate 22, the regions where the light sources S1 to S5 are arranged do not function as regions where contact detection by the touch sensor substrate 22 is possible, and thus the detectable region is narrowed only by the regions where the light sources S1 to S5 are arranged. On the other hand, when the light sources S1 to S5 are attached to the rear surface of the touch sensor substrate 22, the light sources S1 to S5 are positioned within the detectable region of the touch sensor substrate 22 in plan view of the operation pad 20, and thus a ratio of the detectable region of the touch sensor substrate 22 to the upper plate portion 21a can be increased.

The attachment structure of the light sources S1 to S5 is not limited to the example of the input device 10. That is, some or all of the light sources S1 to S5 do not need to be attached to the touch sensor substrate 22. For example, the operation pad 20 may have an FPC separately from the touch sensor substrate 22. In addition, some or all of the light sources S1 to S5 may be attached to the FPC.

[Positions of Light Sources and Light-Emitting Units]

As depicted in FIG. 1B, the operation pad 20 has the light source S1 that intersects with the center line L1 (the center line of the touch sensor substrate 22) of the operation pad 20 along the front-rear direction. The light-emitting unit E1 is also arranged so as to intersect with the same center line L1, and shines with light from the light source S1. The light-emitting unit E1 is formed forward relative to the front edge of the touch sensor substrate 22. The light source S1 is arranged so as to emit light forward. In the example of the input device 10, the light-emitting unit E1 has a long narrow strip shape in the left-right direction. The shape and size of the light-emitting unit E1 are not limited to this.

As depicted in FIG. 1B, the four light sources S2 to S5 are arranged so as to surround the center Cp of the operation pad 20. Specifically, the four light sources S2 to S5 are arranged in a region R1 defined on the right front side with respect to the center Cp, a region R2 defined on the left front side with respect to the center Cp, a region R3 defined on the left rear side with respect to the center Cp, and a region R4 defined on the right rear side with respect to the center Cp, respectively. More specifically, the light sources S2 to S5 are arranged at the respective four corners of the touch sensor substrate 22.

Thus, the four light sources S2 to S5 are arranged symmetrically with respect to the center line L1 of the operation pad 20 along the front-rear direction and the center line L2 of the operation pad 20 along the left-right direction. That is, the light source S2 and the light source S3 are positioned on the sides opposite to each other across the center line L1 along the front-rear direction, the light source S4 and the light source S5 are positioned on the sides opposite to each other across the center line L1 along the front-rear direction, the light source S3 and the light source S4 are positioned on the sides opposite to each other across the center line L2 along the left-right direction, and the light source S5 and the light source S2 are positioned on the sides opposite to each other across the center line L2 along the left-right direction.

As depicted in FIG. 1B, the light-emitting units E2 to E5 are positioned so as to surround the center Cp of the operation pad 20 as similar to the light sources S2 to S5. Specifically, the four light-emitting units E2 to E5 are positioned in the above-described regions R1 to R4, respectively. More specifically, the light-emitting units E2 to E5 are positioned at the respective four corners of the operation pad 20. The light-emitting units E2 to E5 are positioned outside the outer edge of the touch sensor substrate 22. The four light sources S2 to S5 emit light toward the outside of the outer edge of the touch sensor substrate 22. In the example of the input device 10, the shapes of the light-emitting units E2 to E5 are circles (points). The shapes and sizes of the light-emitting units E2 to E5 are not limited to this. For example, each of the light-emitting units E2 to E5 may have a strip shape or a polygonal shape.

The arrangement and number of the light sources S1 to S5 are not limited to the example of the input device 10. For example, the operation pad 20 does not need to have the light source S1 and the light-emitting unit E1 that are positioned at the center in the left-right direction. In addition, the light sources S2 to S5 do not need to be positioned at the corners of the touch sensor substrate 22. For example, two light sources may be arranged so as to intersect with the center line L1 and/or the center line L2 of the operation pad 20 along the left-right direction. In this case, the number of light sources provided in the operation pad 20 may be two (the light source on the right side and the light source on the left side). In addition, the number of light-emitting units and the number of light sources may be five or more. For example, plural light-emitting units and plural light sources may be arranged along the respective four edges (the front edge, left edge, rear edge, and right edge) of the operation pad 20. In still another example, the number of light-emitting units and the number of light sources do not necessarily need to match each other. That is, plural light sources may be provided for one light-emitting unit.

[Guide Function of Depression Operation]

As described above, the operation pad 20 can be moved up and down. The positions where the light-emitting units E1 to E5 are formed can be separately pushed down. For example, the operation pad 20 can be tilted so as to lower the position of the light-emitting unit E2, and the operation pad 20 can be tilted so as to lower the position of the light-emitting unit E3. According to this structure, for example, the user can be guided to a position where a depression operation is to be applied or a position where a depression operation can be input by allowing the light-emitting units E1 to E5 to shine. For example, by blinking the light-emitting unit E1, the user can recognize the light-emitting unit E1 as a position to be pushed or a position that can be pushed.

As described above, the switch 31 is mounted on the main substrate 30, and the push portion 23a is formed at the center of the operation pad 20. The depression operation for each of the light-emitting units E1 to E5 can be detected by one switch 31. That is, when the position of the light-emitting unit E1 is pushed down, the push portion 23a pushes the switch 31, and the depression operation to the position of the light-emitting unit E1 can be detected. The same is true for the other light-emitting units E2 to E5. When the depression operation to the positions of the light-emitting units E1 to E5 is detected by the switch 31, the input device 10 transmits to the information processing device a signal (coordinate information) indicating the position touched by the user and a signal indicating that the switch 31 is pushed.

As depicted in FIG. 1B and FIG. 2, the operation pad 20 has a flange portion 21d at the outer edge thereof. The flange portion 21d is formed at the right edge, the left edge, the rear edge, and the front edge (lower edge) of the operation pad 20. The flange portion 21d is formed at, for example, the exterior plate 21. The flange portion 21d is a portion formed further outside the above-described upper plate portion 21a (the portion exposed upward) and the front plate portion 21b (the portion exposed forward). The flange portion 21d is positioned on the lower side of the edge of the opening 40a formed in the upper case 40U, and the upward movement is restricted by the edge of the opening 40a. Thus, for example, when the position of the light-emitting unit E2 on the right side is pushed down, the operation pad 20 is tilted, and the push portion 23a is lowered to push the switch 31. In addition, when the position of the light-emitting unit E3 on the left side is pushed down, the operation pad 20 is tilted, and the push portion 23a is lowered to push the switch 31.

[Light Diffusion Member]

As described above, the operation pad 20 has the light diffusion members H1 to H5 as optical paths for light emitted from the light sources S1 to S5. The light diffusion members H1 to H5 are, for example, resin with a material (particle) for reflecting light added, and light entering the light diffusion members H1 to H5 diffuses inside, and spreads to the whole of the light diffusion members H1 to H5.

As depicted in FIG. 5, the light diffusion members H1 to H5 are arranged along the outer edge of the touch sensor substrate 22. Specifically, the light diffusion member H1 where light of the light source S1 enters extends in the left-right direction along the front edge of the touch sensor substrate 22. The light diffusion member H2 where light of the light source S2 enters has a first portion h1 extending in the left-right direction along the front edge of the touch sensor substrate 22 and a second portion h2 extending in the front-rear direction along the right edge of the touch sensor substrate 22. The light diffusion member H2 has a coupling portion h3 for connecting the first portion h1 and the second portion h2 while avoiding the position of the light source S2. The light diffusion member H3 has a structure symmetrical to the light diffusion member H2, and has a first portion h1, a second portion h2, and a coupling portion h3. In addition, each of the light diffusion members H4 and H5 similarly has a first portion h1, a second portion h2, and a coupling portion h3.

As depicted in FIG. 1B, the light-emitting units E1 to E5 are defined outside the outer edge of the touch sensor substrate 22. The light diffusion members H1 to H5 are positioned below the light-emitting units E1 to E5, respectively (see FIG. 2 to FIG. 4). That is, the light-emitting units E1 to E5 and the optical paths (the light diffusion members H1 to H5) for light that allows the light-emitting units E1 to E5 to shine are formed or arranged using a region between the outer edge of the touch sensor substrate 22 and the outer edge (specifically, the outer edge of the upper plate portion 21a) of the exterior plate 21. The exterior plate 21 is formed of, for example, an opaque material. In this case, for example, holes penetrating the exterior plate 21 in the up-down direction are formed at the positions of the light-emitting units E1 to E5. The plural light sources S1 to S5 are attached to the rear surface (that is, the contact detectable region) of the touch sensor substrate 22, and emit light toward the outside of the outer edge of the touch sensor substrate 22, that is, toward the light diffusion members H1 to H5. The light entering the light diffusion members H1 to H5 diffuses inside, and exits to the upper side of the exterior plate 21 through the holes that are the light-emitting units E1 to E5. In other words, the plural light sources S1 to S5 emit light from the inside of the contact detectable region to the outside, and allow the light-emitting units E1 to E5 exposed at the surface of the exterior plate 21 to shine through the optical paths (the light diffusion members H1 to H5) formed between the edge of the touch sensor substrate 22 and the edge of the exterior plate 21 (the upper plate portion 21a).

As depicted in FIG. 2 to FIG. 4, the light diffusion members H1 to H5 have projection portions h4 at the positions of the light-emitting units E1 to E5. On the other hand, the rear surface of the exterior plate 21 has recess portions 21c at the positions of the light-emitting units E1 to E5. The projection portions h4 are fitted in the recess portions 21c. According to this structure, since the distances from the light diffusion members H1 to H5 to the surface (upper surface) of the exterior plate 21 are reduced, the luminance of the light-emitting units E1 to E5 can be sufficiently secured.

[Light Shielding]

As depicted in FIG. 2, the back frame 23 attached to the rear side (lower side) of the exterior plate 21 has a plate shape and covers the lower side of the light sources S1 to S5. The back frame 23 is formed of an opaque material and suppresses light of the light sources S1 to S5 from leaking downward.

As depicted in FIG. 2 and FIG. 3, the light diffusion members H1 and H2 are arranged and held between the upper plate portion 21a of the exterior plate 21 and the back frame 23. According to the attachment structure of the light diffusion members H1 and H2, the exterior plate 21 can prevent the light of the light diffusion members H1 and H2 from leaking downward without increasing the number of parts. As similar to the light diffusion members H1 and H2, the light diffusion members H3 to H5 are arranged and held between the upper plate portion 21a of the exterior plate 21 and the back frame 23. With this structure, the exterior plate 21 can prevent the light of the light diffusion members H3 to H5 from leaking downward.

The light sources S1 to S5 are configured to emit light in different colors. For example, each of the light sources S1 to S5 includes a red light emitting element, a blue light emitting element, and a green light emitting element. In addition, a control device of the input device 10 changes the light emitting color of each of the light sources S1 to S5 in accordance with, for example, an instruction from the information processing device.

The operation pad 20 has a light shielding wall for preventing color mixing of light. For example, the light shielding wall is arranged between two adjacent light sources. In the example of the input device 10, as depicted in FIG. 5, light shielding walls 23b and 23c are formed so as to surround each of the light sources S1 to S5. The light source S1 arranged at the center in the left-right direction is surrounded by the light shielding wall 23b and the light diffusion member H1 in plan view of the input device 10. The light shielding wall 23b and the light diffusion member H1 define a closed region. The light source S2 arranged at the corner of the touch sensor substrate 22 is surrounded by the light shielding wall 23c and the light diffusion member H2 in plan view of the input device 10. As similar to the light source S2, the light sources S3 to S5 are also surrounded by the light diffusion members H3 to H5 and the light shielding walls 23c.

As depicted in FIG. 2 to FIG. 4, the light shielding walls 23b and 23c are formed integrally with, for example, the back frame 23. The light shielding walls 23b and 23c project upward from the back frame 23, and the upper ends thereof reach the touch sensor substrate 22. Unlike the example of the input device 10, a dedicated member having the light shielding walls 23b and 23c may be attached to the operation pad 20.

In addition, the operation pad 20 also has a light shielding wall arranged between two adjacent light diffusion members. Specifically, as depicted in FIG. 5, a light shielding wall 21f is formed between the central light diffusion member H1 and the left and right light diffusion members H2 and H3. The light shielding wall 21f prevents light of the light diffusion member H1 from being mixed with light of the light diffusion member H2, and prevents light of the light diffusion member H1 from being mixed with light of the light diffusion member H3. In addition, a light shielding wall 21h is formed between the first portion h1 of the light diffusion member H4 and the first portion h1 of the light diffusion member H5 on the left and right sides. Further, light shielding walls 21g are formed between the second portions h2 of the light diffusion members H2 and H3 on the front side and the second portions h2 of the light diffusion members H5 and H4 on the rear side. As similar to the light diffusion members H1 to H5, the light shielding walls 21f, 21g, and 21h are arranged using a region between the outer edge of the touch sensor substrate 22 and the outer edge (specifically, the outer edge of the upper plate portion 21a) of the exterior plate 21. These light shielding walls 21f, 21g, and 21h are formed integrally with, for example, the exterior plate 21.

As depicted in FIG. 4 and FIG. 5, the operation pad 20 further has a light shielding wall 23e formed along the outer edge of the operation pad 20. The light shielding wall 23e is arranged outside the light diffusion members H2 to H5 in plan view, and surrounds these light diffusion members H2 to H5. That is, the light shielding wall 23e is formed along the right sides of the light diffusion members H2 and H3, the rear sides of the light diffusion members H3 and H4, and the right sides of the light diffusion members H4 and H5. The presence of the light shielding wall 23e can suppress light from leaking from between the operation pad 20 and the edge of the opening 40a of the upper case 40U.

In the example of the input device 10, the front plate portion 21b of the exterior plate 21 is formed along the front side of the light diffusion members H1 to H3. Therefore, the front plate portion 21b also functions as a light shielding wall. As depicted in FIG. 2, a gap k is secured between the front edge (lower edge) 40b of the opening 40a of the upper case 40U and the lower edge 21h of the front plate portion 21b to permit the up and down movement of the operation pad 20. The inner surface 21i of the front plate portion 21b extends obliquely downward and reaches a position behind the front edge of the back frame 23. This structure of the front plate portion 21b suppresses light from leaking out of the gap k.

Note that the shapes of the light diffusion members H1 to H5 are not limited to the example of the input device 10. Each of the light diffusion members H2 to H5 does not need to have the second portion h2 bent with respect to the first portion h1 and the coupling portion h3 for coupling them to each other. That is, the light diffusion members H2 to H5 may have only portions positioned in the light emitting directions of the light sources S2 to S5.

[Summary]

As described above, the operation pad 20 has the exterior plate 21 having the light-emitting units E1 to S5 and the touch sensor substrate 22 attached to the rear surface of the exterior plate 21, and can be moved up and down. In addition, the operation pad 20 has the light sources S1 to S5 attached to the rear surface thereof and the light diffusion members H1 to H5 that are optical paths through which light of the light sources S1 to S5 passes toward the light-emitting units E1 to E5. In the input device 10, since the light sources S1 to S5 are attached to the operation pad 20, the optical paths from the light sources S1 to S5 to the light-emitting units E1 to E5 can be shortened, the structure for allowing the light-emitting units E1 to E5 to shine can be downsized, and the degree of freedom for the positions of the light-emitting units E1 to E5 can be increased.

In addition, the light sources S1 to S5 are attached to the touch sensor substrate 22. Accordingly, the number of parts of the input device 10 can be reduced.

[Modified Example]

Note that the input device proposed in the present disclosure is not limited to the example of the above-described input device 10.

For example, the light diffusion members H1 to H5 are used as the optical paths in the input device 10. However, a light guide member may be used as an optical path. The light guide member is formed of, for example, a transparent material. In addition, light entering the inside of the light guide member is totally reflected on the outer surface of the light guide member so as to advance to a light emitting surface (emission surface of light) formed at a part of the outer surface of the light guide member.

Figure 6:
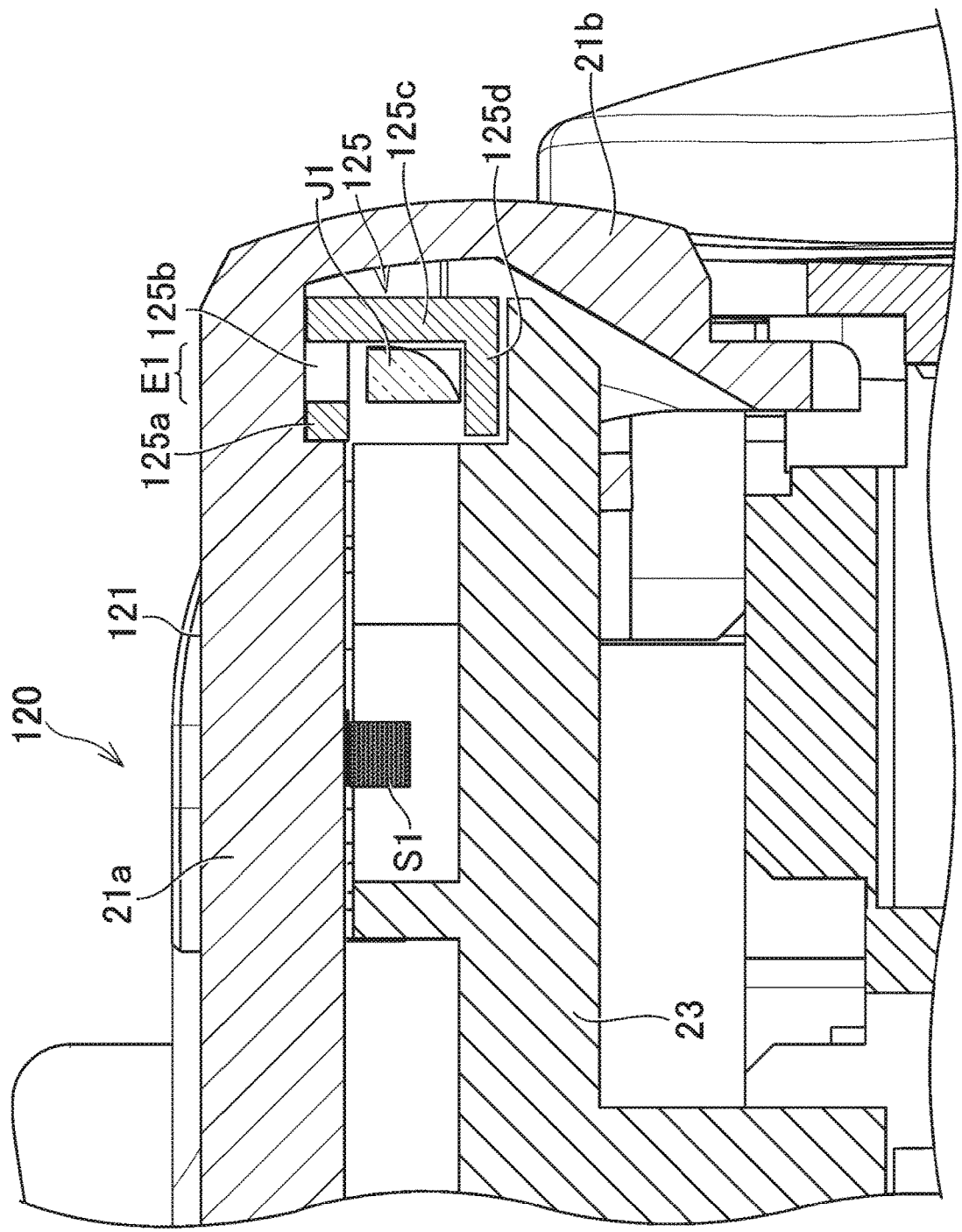
FIG. 6 is a cross-sectional view for depicting another example of the input device proposed in the present disclosure.

FIG. 6 depicts an example of an operation pad having the light guide member. The cutting position of FIG. 6 is the same as that of FIG. 2, and the light source S1 is depicted in the drawing. An operation pad 120 depicted in FIG. 6 has a light guide member J1 that receives light of the light source S1. The operation pad 120 has a light shielding member 125 in which the light guide member J1 is arranged. An opening 125b is formed at a part of an upper wall 125a of the light shielding member 125, and light entering the light guide member J1 exits upward from the opening 125b. An exterior plate 121 of the operation pad 120 is formed of a light transmissive material. Light that exited from the opening 125b passes through the exterior plate 121 and exits upward. Thus, the position of the opening 125b corresponds to the light-emitting unit E1. That is, the range of the light-emitting unit E1 is defined by the light shielding member 125. The light shielding member 125 has, for example, a light shielding wall 125c formed along the front side of the light guide member J1 and a light shielding wall 125d formed along the lower side of the light guide member J1. For each of the other light sources S2 to S5, the operation pad 120 may have the light guide member and the light shielding member 125 defining the range of each of the light-emitting units E2 to E5.

In addition, each of the light-emitting units E2 to E5 may have a strip shape. For example, as depicted in FIG. 7, each of the light-emitting units E2 to E5 may have a substantially L-shape bent along the corner of the exterior plate 21. Each of the light-emitting units E2 to E5 in this case may be a hole formed in the exterior plate 21 or may be defined by the opening 125b of the light shielding member 125 as exemplified in FIG. 6.

In addition, in the above description, each of the LEDs as the light sources S1 to S5 included the red light emitting element, the blue light emitting element, and the green light emitting element, and the light emitting color of each of the light sources S1 to S5 could be controlled. Unlike this, for example, only the light emitting color of the light source S1 can be changed, and the light emitting colors of the remaining light sources S2 to S5 may be fixed to, for example, white.

In addition, in the above description, the operation pads 20 and 120 have the five light sources S1 to S5, and an operation pad 220 has the four light sources S2 to S5. However, the number of light sources provided in each operation pad may be one, or five or more.

In addition, in the above description, the light diffusion members H1 to H5 and the light guide member J1 are used as optical paths for light. However, as the optical paths for light, spaces through which light passes or reflection films formed in the spaces may be used instead of the light diffusion members and the light guide member.

The invention claimed is:

1. An input device comprising:
   an operation pad having an exterior plate having at least one light-emitting unit oriented to emit light perpendicularly through a plane defined by the exterior plate, and a touch sensor substrate attached to a rear surface of the exterior plate;
   at least one light source attached to a rear surface of the operation pad; and
   an optical path through which light of the at least one light source passes toward the at least one light-emitting unit, wherein:
   the operation pad is moved up and down and is lowered by receiving a push operation; and
   at least one of: (i) the at least one light-emitting unit, the at least one light source, and the optical path are integrally moved by receiving a pushing operation of the operation pad; and (ii) the operation pad has a first light-emitting unit and a second light-emitting unit as the at least one light-emitting unit, and a position of the first light-emitting unit and a position of the second light-emitting unit are separately pushed down.

2. The input device according to claim 1, wherein the at least one light source is attached to the touch sensor substrate.

3. The input device according to claim 2, wherein the at least one light source is attached to a rear surface of the touch sensor substrate.

4. The input device according to claim 2, wherein the touch sensor substrate and a main substrate are provided.

5. The input device according to claim 2, wherein
   the at least one light-emitting unit is positioned outside the touch sensor substrate in plan view of the operation pad, and
   the optical path is a light diffusion member or a light guide member at least a part of which is positioned outside the touch sensor substrate in plan view of the operation pad.

6. The input device according to claim 1, wherein
   a first light source and a second light source are attached to the operation pad as the at least one light source, and
   the first light source and the second light source are positioned on sides opposite to each other across a center line of the operation pad.

7. The input device according to claim 1, wherein
the operation pad has plural light sources as the at least one light source, and
the plural light sources are arranged so as to surround a center of the operation pad.

8. The input device according to claim 1, wherein
a sensor for detecting depression of the operation pad is further provided, and
the first light-emitting unit and the second light-emitting unit are positioned on sides opposite to each other across a center line passing through a position of the sensor in plan view of the operation pad.

9. The input device according to claim 1, wherein
plural light-emitting units arranged apart from each other are provided as the at least one light-emitting unit, and
plural light sources corresponding to the respective plural light-emitting units are provided as the at least one light source.

10. The input device according to claim 9, wherein a light shielding wall is formed between two adjacent light sources.

11. The input device according to claim 9, wherein a light shielding wall is formed between two adjacent light-emitting units.

12. An input device comprising:
an operation pad having an exterior plate having at least one light-emitting unit, and a touch sensor substrate attached to a rear surface of the exterior plate;
at least one light source attached to a rear surface of the operation pad; and
an optical path through which light of the at least one light source passes toward the at least one light-emitting unit,
wherein the operation pad is moved up and down and is lowered by receiving a push operation, and
wherein the at least one light-emitting unit, the at least one light source, and the optical path are integrally moved by receiving a pushing operation of the operation pad.

13. An input device comprising:
an operation pad having an exterior plate having at least one light-emitting unit oriented to emit light perpendicularly through a plane defined by the exterior plate, and a touch sensor substrate attached to a rear surface of the exterior plate;
at least one light source attached to a rear surface of the operation pad; and
an optical path through which light of the at least one light source passes toward the at least one light-emitting unit, wherein:
plural light-emitting units arranged apart from each other are provided as the at least one light-emitting unit, and
plural light sources corresponding to the respective plural light-emitting units are provided as the at least one light source.

* * * * *